(12) United States Patent
Takeshita et al.

(10) Patent No.: US 6,315,922 B1
(45) Date of Patent: Nov. 13, 2001

(54) LIQUID CRYSTAL COMPOSITION AND LIQUID CRYSTAL DISPLAY ELEMENT

(75) Inventors: Fusayuki Takeshita; Etsuo Nakagawa; Yasuhiro Kubo, all of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/551,643

(22) Filed: Apr. 18, 2000

(30) Foreign Application Priority Data

Apr. 19, 1999 (JP) .................................................. 11-110818
Jan. 18, 2000 (JP) .................................................. 12-009396

(51) Int. Cl.$^7$ .......................... C09K 19/34; C09K 19/30; C09K 19/12; C09K 19/20
(52) U.S. Cl. ................. 252/299.61; 252/299.63; 252/299.66; 252/299.67
(58) Field of Search ............... 252/299.01, 299.63, 252/299.66, 299.61, 299.67; 428/1.1

(56) References Cited

U.S. PATENT DOCUMENTS

| | | | |
|---|---|---|---|
| 5,858,270 | 1/1999 | Matsui et al. | 252/299.01 |
| 5,961,881 | * 10/1999 | Andou et al. | 252/299.63 |
| 6,187,223 | * 2/2001 | Andou et al. | 252/299.63 |

FOREIGN PATENT DOCUMENTS

| | | |
|---|---|---|
| 0786445 | 7/1997 | (EP) . |
| 0786508 | 7/1997 | (EP) . |
| 0844295 | 5/1998 | (EP) . |
| 2-237949 | 9/1990 | (JP) . |
| 8-73857 | 3/1996 | (JP) . |
| 9-31460 | 2/1997 | (JP) . |
| 10-251186 | 9/1998 | (JP) . |

OTHER PUBLICATIONS

Patent Abstracts of Japan, vol. 1998, No. 14, Dec. 31, 1998 & JP 10 251186 A (Chisso Corporation), Sep. 22, 1998.

Jakeman et al., "Electro–Optic Response Times in Liquid Crystals", Physics Letters, vol. 39A, No. 1, Apr. 10, 1972, pp. 69–70.

Abstract of WO 96/11897, 1996.

* cited by examiner

*Primary Examiner*—Shean C. Wu
(74) *Attorney, Agent, or Firm*—Wenderoth, Lind & Ponack, L.L.P.

(57) ABSTRACT

The present invention provides a liquid crystal composition comprising a component A being at least one compound selected from the group of compounds represented by Formulas (1-1) and (1-2) in the specification and a component B being at least one compound selected from the group of compounds represented by Formulas (2-1), (2-2), (2-3), (2-4) and (2-5) in the specification. This liquid crystal composition satisfies general characteristics required for a liquid crystal display element of an active matrix mode (AM-LCD).

4 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates to a nematic liquid crystal composition. More specifically, the present invention relates to a liquid crystal composition for an active matrix (AM) mode and a liquid crystal display element (LCD) using this liquid crystal composition.

2. Description of the Related Art

A liquid crystal display element (AM-LCD) of an active matrix mode enables highly fine display, and therefore it attracts attentions as the most likely candidate of LCD and is applied to display faceplates for monitors, note type personal computers, digital still cameras, digital video cameras and the like. Characteristics required to a liquid crystal composition for AM-LCD include the following (1) to (5):

(1) In order to expand a temperature range in which the liquid crystal display element can be used, the liquid crystal composition shows a nematic phase in as broad temperature range as possible (the upper limit temperature of the nematic phase is elevated as much as possible, and the lower limit temperature of the nematic phase is lowered as much as possible).

(2) In order to accelerate the response speed of the liquid crystal display element, the liquid crystal composition is reduced in a viscosity as much as possible.

(3) In order to raise the contrast of the liquid crystal display element, the optical anisotropy value ($\Delta n$) of the liquid crystal composition can take a suitable vale according to the cell thickness (d) of the liquid crystal display element.

(4) In order to raise the contrast of the liquid crystal display element, the resistivity value of the liquid crystal composition is elevated, and the voltage-holding ratio of a cell into which the liquid crystal composition is charged is elevated. In particular, the voltage-holding ratio in a high temperature area is elevated. Measurement of the voltage-holding ratio in a high temperature area corresponds to an acceleration test for making sure of the durability of the liquid crystal composition.

(5) In order to miniaturize a battery which is a driving power source for the liquid crystal display element, the liquid crystal composition is reduced in a threshold voltage.

In light of such backgrounds, disclosed in Japanese Patent Application Laid-Open No. 73857/1996 is a liquid crystal composition which has a high voltage-holding ratio and is reduced in a threshold voltage and which has a suitably large optical anisotropy. Also, disclosed in Japanese Patent Application Laid-Open No. 31460/1997 is a liquid crystal composition which, in particular, has a low threshold voltage, an excellent compatibility at a low temperature and a broad temperature range of a nematic phase while satisfying various characteristics required to a liquid crystal composition for AM-LCD. Further, disclosed in International Publication WO96/11897 are a novel liquid crystal compound which has a large dielectric constant anisotropy and is notably low in a viscosity as a liquid crystal compound for low voltage driving in various modes including an AM mode and an STN mode, and a liquid crystal composition containing the same. A liquid crystal composition using a compound which is analogous to the compound of the present invention represented by Formula (1-1) is described in Japanese Patent Application Laid-Open No. 251186/1998.

Driving power sources for note type personal computers, digital still cameras, digital video cameras and the like depend on batteries. In order to use these batteries for long time by one charging, a power consumption of LCD has to be reduced. In recent years, these batteries have been further miniaturized and come to be elongated in use time by one charging. Accordingly, liquid crystal compositions have come to be desired to be reduced in a threshold voltage while maintaining the characteristics shown in the items (1) to (4) described above.

In order to reduce a threshold voltage of a liquid crystal composition, a liquid crystal compound having a large dielectric constant anisotropy has to be used. If a liquid crystal compound having a large dielectric constant anisotropy is used to prepare a liquid crystal composition, the liquid crystal composition is increased in a viscosity. Accordingly, a liquid crystal display element using a liquid crystal composition having a low threshold voltage is slow as well in a response speed.

As proposed by E. Jakeman et al [Phys. Lett., A, 39 (1972) 69], this is because a response speed is proportional to a square of a cell gap, and a cell gap of a cell constituting a liquid crystal display element can be reduced in order to accelerate the response speed. As shown in the item (3) described above, however, in a first minimum condition of a TN mode, a value shown by a product ($\Delta n \cdot d$) of a cell gap of a cell constituting a liquid crystal display element and optical anisotropy of a liquid crystal composition is set to about 0.4 to about 0.5 in order to obtain a high contrast, and therefore if the cell gap is reduced, the optical anisotropy of the liquid crystal composition has to be inevitably increased.

The composition disclosed in Japanese Patent Application Laid-Open No. 73857/1996 described above has the defects that as shown in the comparative examples in the present invention, while the threshold voltage is low and the optical anisotropy is suitably large, the nematic phase has a too low upper limit temperature and the voltage-holding ratio in a high temperature area is low and the defects that while the optical anisotropy is suitably large and the nematic phase has a high upper limit temperature, the threshold voltage is too high and the voltage-holding ratio in a high temperature area is low.

A composition disclosed in Japanese Patent Application Laid-Open No. 31460/1997 has the defects that as shown in the comparative examples in the present invention, the optical anisotropy is small and the threshold voltage is high and that the nematic phase has a low upper limit temperature. Usually, a compound having a cyano group has a low voltage-holding ratio and therefore can not be used for a liquid crystal composition for AM-LCD.

A liquid crystal composition for AM-LCD which does not contain a compound having a cyano group at a terminal is disclosed in International Publication WO96/11897. This composition has the defects that as shown in the comparative examples in the present invention, the threshold voltage is not sufficiently lower and the optical anisotropy is small.

Compounds having three phenylene rings and one —$CF_2O$— bonding group in a molecule are disclosed in Japanese Patent Application Laid-Open No. 251186/1998, but among the physical property values described in the examples thereof in the compositions comprising the F base compound having a high holding rate, the threshold voltage falls in a range of 1.29 V to 2.37 V and is relatively high.

As described above, various investigations of liquid crystal compositions have been carried out, but satisfactory liquid crystal compositions for AM-LCD are not obtained. That is, required are liquid crystal compositions for AM-LCD which maintain the characteristics shown in the items (1) and (2) described above but have a low threshold voltage required for reducing a power consumption while maintaining a high voltage-holding ratio in a high temperature area and which are provided with a large optical anisotropy as a reduction in the gap of the cell comes to be required in order to accelerate the response speed.

SUMMARY OF THE INVENTION

An object of the present invention is to provide a liquid crystal composition which satisfies general characteristics required to AM-LCD and which has particularly a high voltage-holding ratio in a high temperature area, a sufficiently low threshold voltage and a large optical anisotropy.

Intensive investigations repeated by the present inventors in order to solve these problems have resulted in finding that a liquid crystal composition capable of achieving the object of the present invention can be obtained by combining a conventional compound having a —CF$_2$O— bonding group with a specific liquid crystal compound which is different in an F substitution number and a substitution position, and thus they have come to complete the present invention.

The liquid crystal composition of the present invention is shown by the following items 1 to 2:

1. A liquid crystal composition comprising a component A being at least one compound selected from the group of compounds represented by Formulas (1-1) and (1-2) and a component B being at least one compound selected from the group of compounds represented by Formulas (2-1), (2-2), (2-3), (2-4) and (2-5):

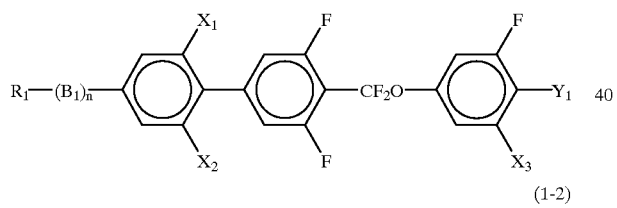

(1-1)

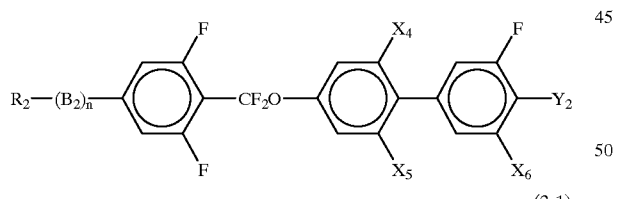

(1-2)

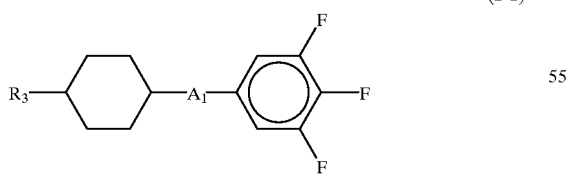

(2-1)

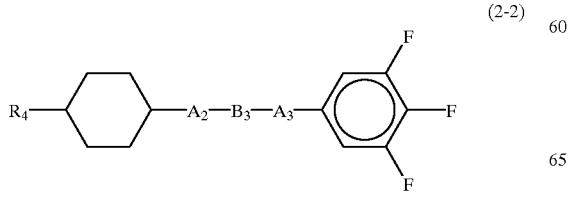

(2-2)

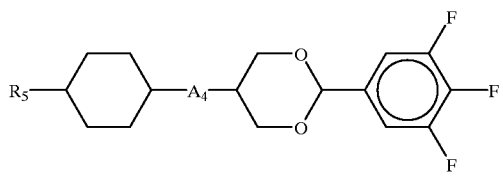

(2-3)

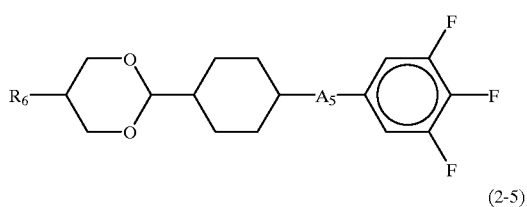

(2-4)

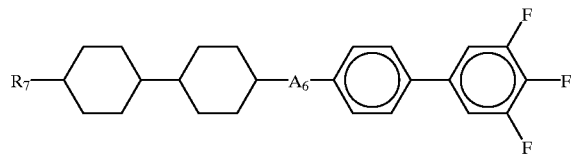

(2-5)

wherein $R_1$, $R_2$, $R_3$ $R_4$, $R_5$, $R_6$ and $R_7$ each represent independently an alkyl group or alkoxy group having 1 to 10 carbon atoms, or an alkenyl group or alkoxymethyl group having 2 to 10 carbon atoms; $A_1$, $A_2$, $A_3$, $A_4$, $A_5$ and $A_6$ each represent independently a single bond, —C$_2$H$_4$— or —COO—; $X_1$, $X_2$, $X_3$, $X_4$, $X_5$ and $X_6$ each represent independently H or F; $B_1$ and $B_2$ each represent independently a single bond, cyclohexylene, trans-1,3-dioxane-2,5-diyl, 1,4-phenylene or 1,4-phenylene substituted by 1 to 4 fluorine atoms; $B_3$ represents 1,4-phenylene, cyclohexylene, or 1,4-phenylene or cyclohexylene substituted by 1 to 4 fluorine,; $Y_1$ and $Y_2$ each represent independently F, CF$_3$, OCF$_3$, CF$_2$H or Cl; and n is 0 or 1.

2. The liquid crystal composition according to the above item 1, comprising the component A of 5 to 95% by weight and the component B of 5 to 95% by weight, respectively, based on the total quantity of the liquid crystal composition.

The liquid crystal display element of the present invention is shown by the following item 3.

3. A liquid crystal display element containing a liquid crystal composition as set forth in any one of items 1 and 2.

DETAILED DESCRIPTION OF PREFERRED EMBODIMENTS

Compounds represented by the following Formulas (1-1-1) to (1-1-31) are preferably used as the compound represented by Formula (1-1) in the liquid crystal composition of the present invention.

(1-1-1)
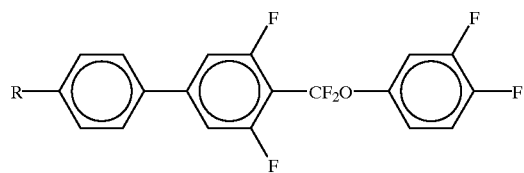
(1-1-2)
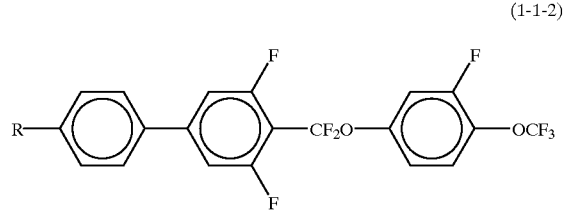
(1-1-3)
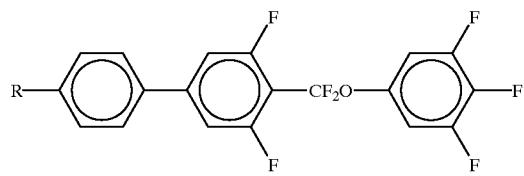
(1-1-4)
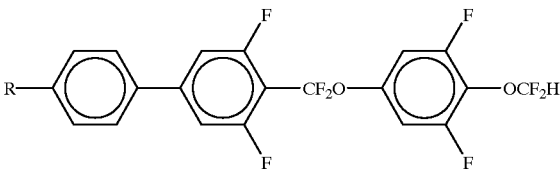
(1-1-5)
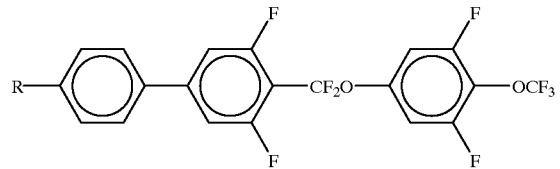
(1-1-6)
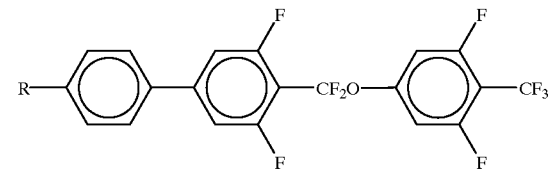
(1-1-7)
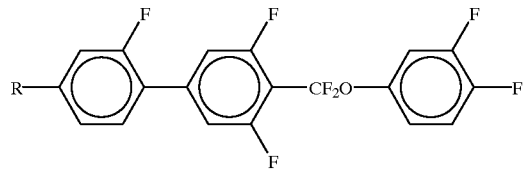
-continued
(1-1-8)
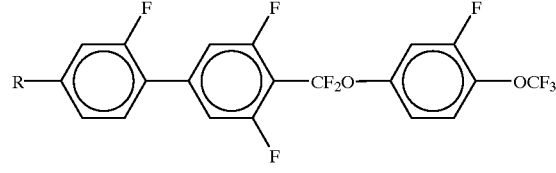
(1-1-9)
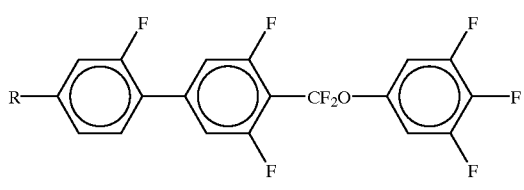
(1-1-10)
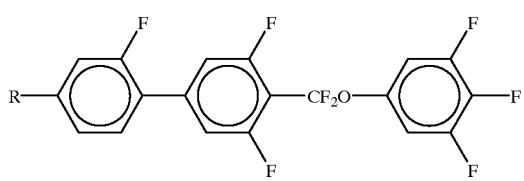
(1-1-11)
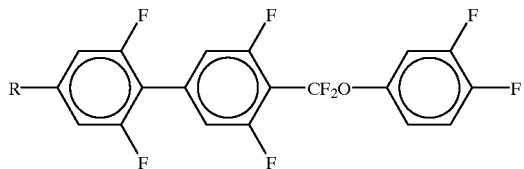
(1-1-12)
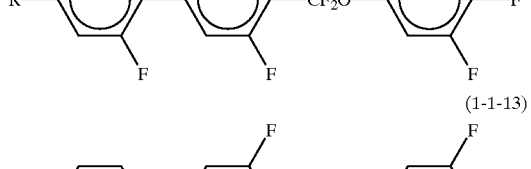
(1-1-13)
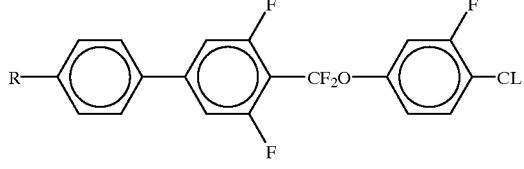
(1-1-14)
(1-1-15)
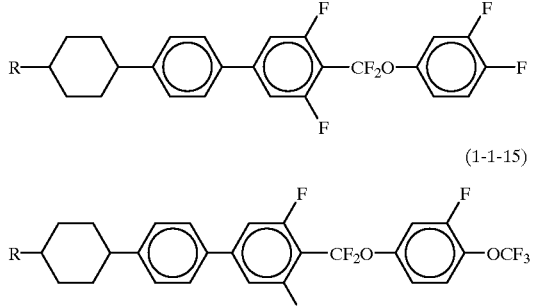

(1-1-16)
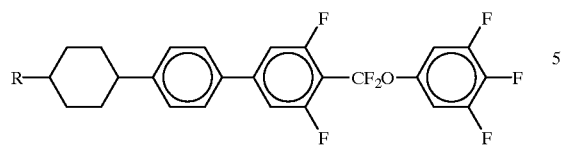
(1-1-17)
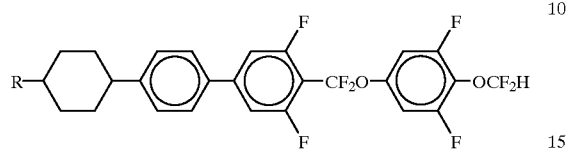
(1-1-18)
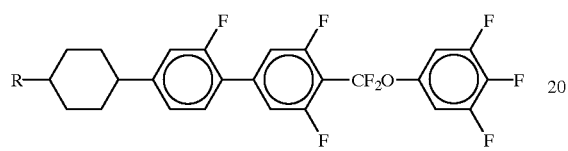
(1-1-19)
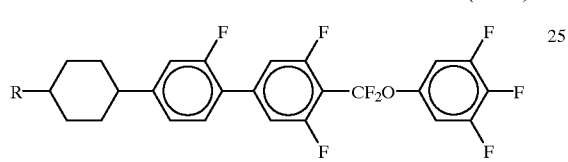
(1-1-20)
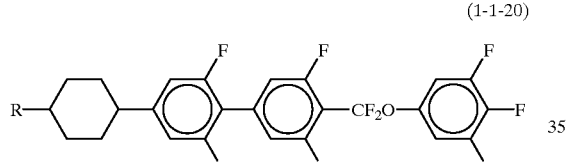
(1-1-21)
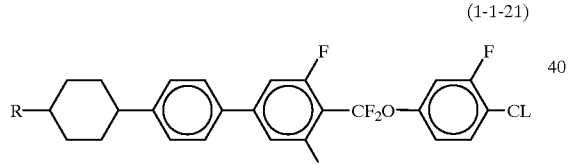
(1-1-22)
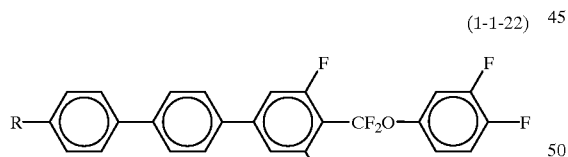
(1-1-23)
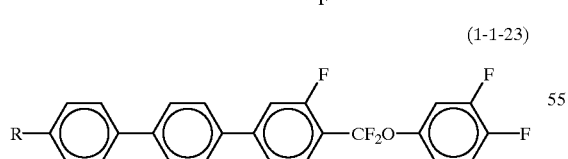
(1-1-24)
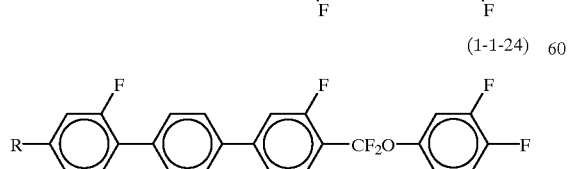
(1-1-25)
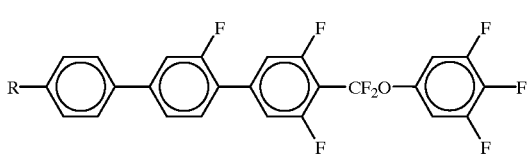
(1-1-26)
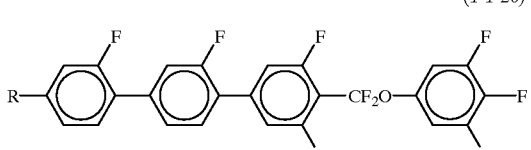
(1-1-27)
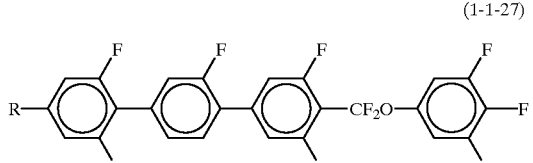
(1-1-28)
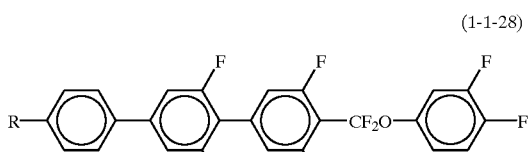
(1-1-29)
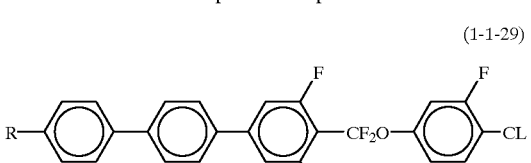
(1-1-30)
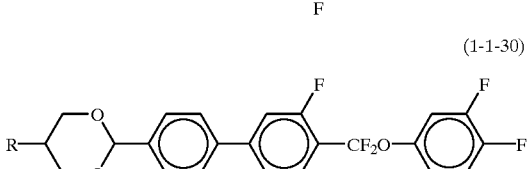
(1-1-31)
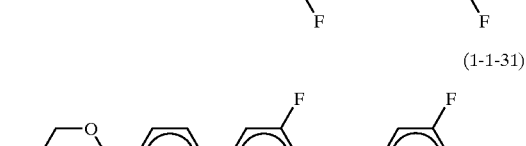
In these formulas, R's each represent independently an alkyl group or alkoxy group having 1 to 10 carbon atoms, or an alkoxymethyl group or alkenyl group having 2 to 10 carbon atoms.
Compounds represented by the following Formulas (1-2-1) to (1-2-21) are preferably used as the compound of the present invention represented by Formula (1-2).

(1-2-1)
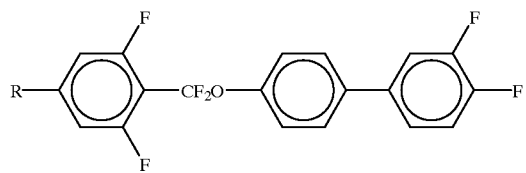
(1-2-2)
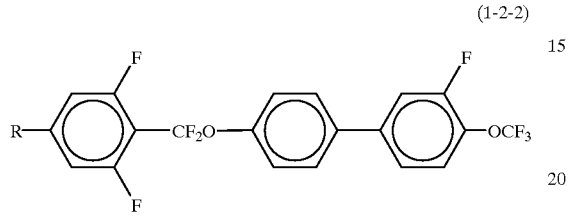
(1-2-3)
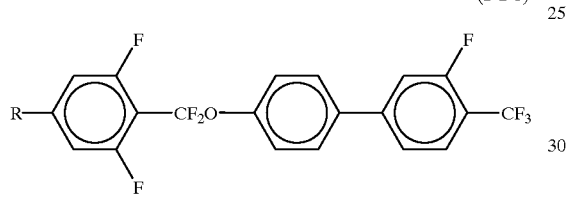
(1-2-4)
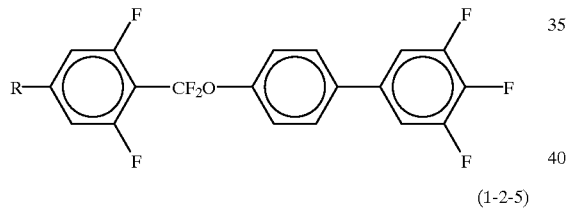
(1-2-5)
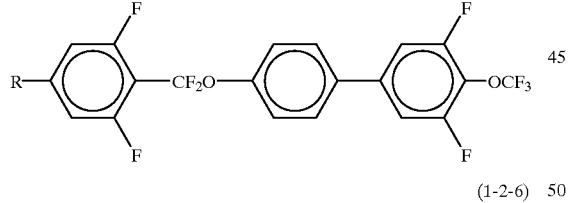
(1-2-6)
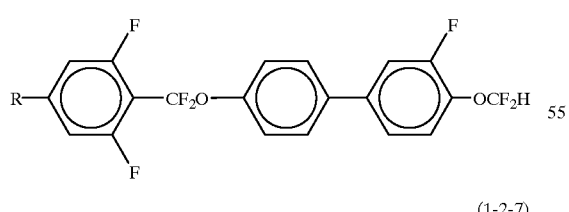
(1-2-7)
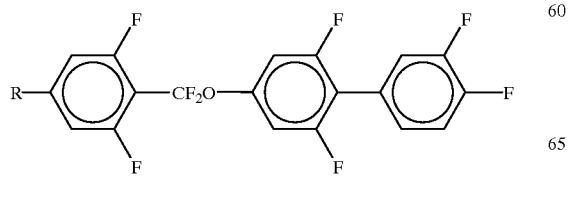
-continued
(1-2-8)
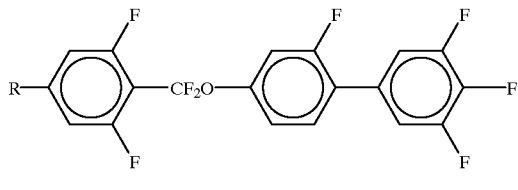
(1-2-9)
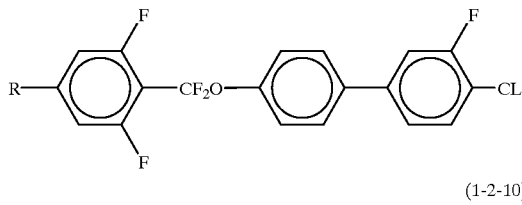
(1-2-10)
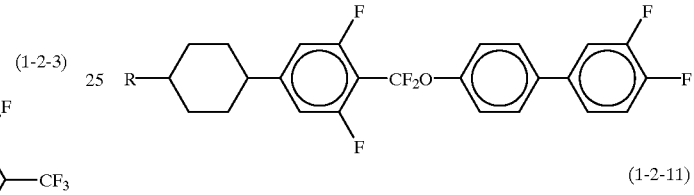
(1-2-11)
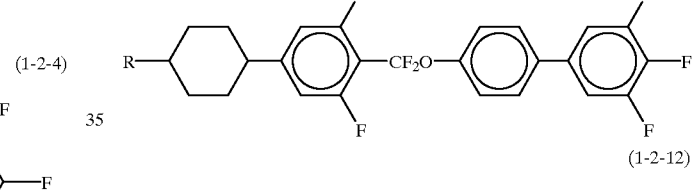
(1-2-12)
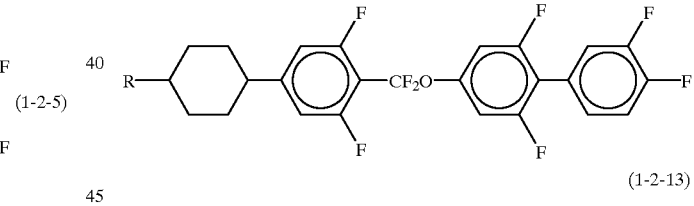
(1-2-13)
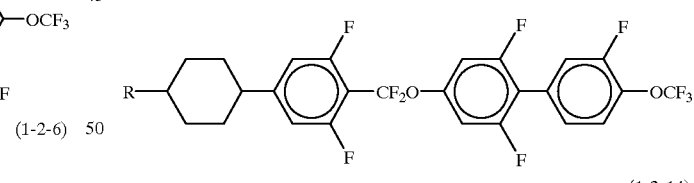
(1-2-14)
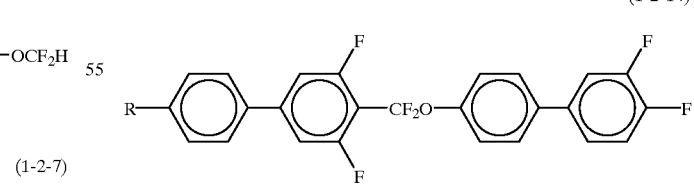
(1-2-15)

(1-2-16)
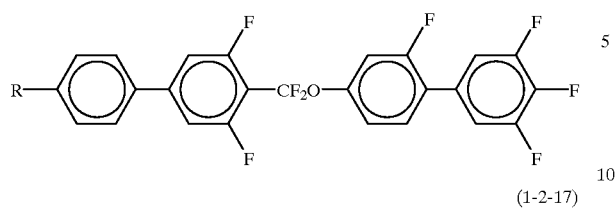

(1-2-17)
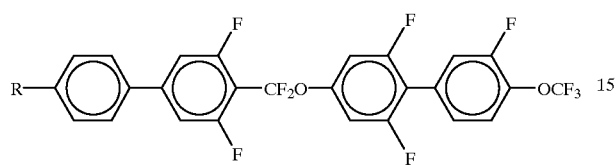

(1-2-18)
(1-2-19)
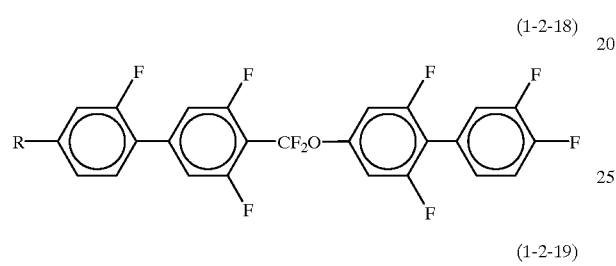

(1-2-20)
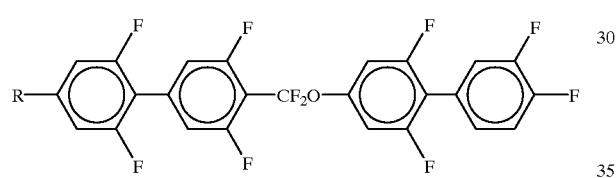

(1-2-21)
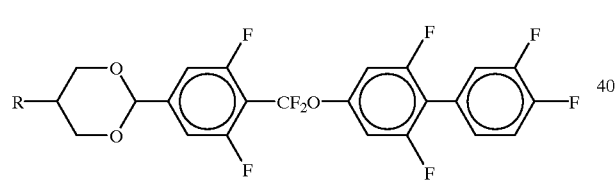

In these formulas, R's each represent independently an alkyl group or alkoxy group having 1 to 10 carbon atoms, or an alkoxymethyl group or alkenyl group having 2 to 10 carbon atoms.

Compounds represented by the following Formulas (2-1-1) to (2-1-3) are preferably used as the compound of the present invention represented by Formula (2-1).

(2-1-1)
(2-1-2)
(2-1-3)
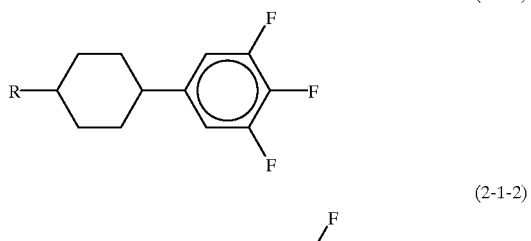
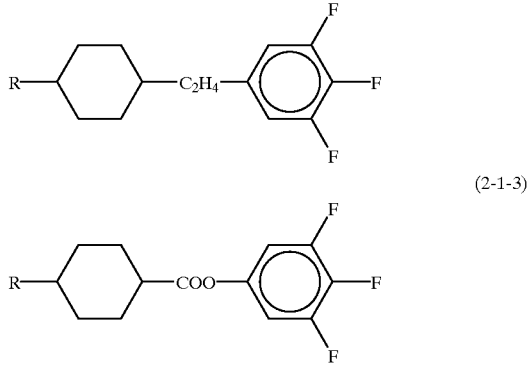

In these formulas, R's each represent independently an alkyl group or alkoxy group having 1 to 10 carbon atoms, or an alkoxymethyl group or alkenyl group having 2 to 10 carbon atoms.

Compounds represented by the following Formulas (2-2-1) to (2-2-7): are preferably used as the compound of the present invention represented by Formula (2-2).

(2-2-1)
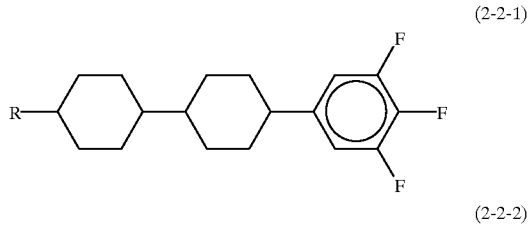

(2-2-2)
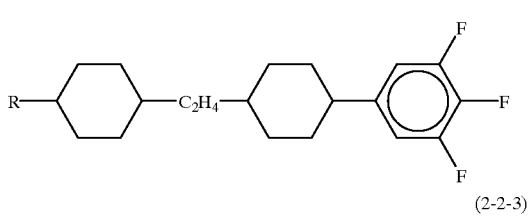

(2-2-3)
(2-2-4)
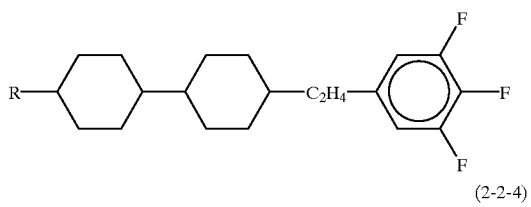

(2-2-5)
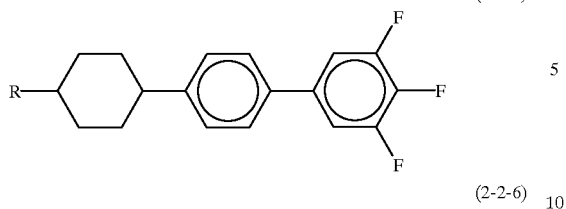

(2-2-6)
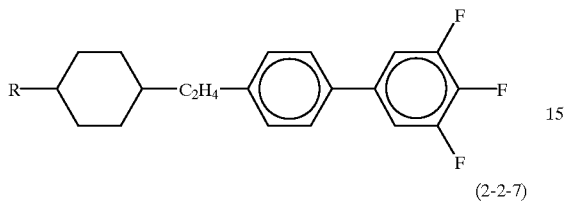

(2-2-7)
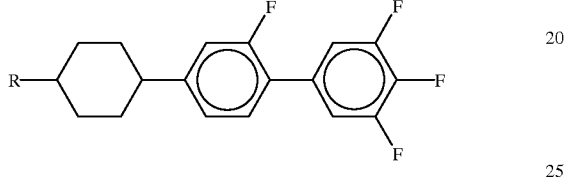

In these formulas, R's each represent independently an alkyl group or alkoxy group having 1 to 10 carbon atoms, or an alkoxymethyl group or alkenyl group having 2 to 10 carbon atoms.

Compounds represented by the following Formulas (2-3-1) or (2-3-2) is preferably used as the compound of the present invention represented by Formula (2-3).

(2-3-1)
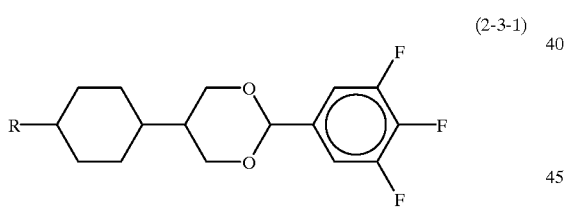

(2-3-2)
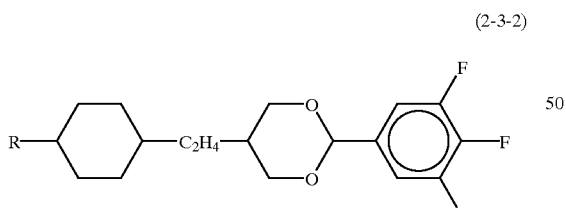

In these formulas, R's each represent independently an alkyl group or alkoxy group having 1 to 10 carbon atoms, or an alkoxymethyl group or alkenyl group having 2 to 10 carbon atoms.

Compounds represented by the following Formulas (2-4-1) or (2-4-3) is preferably used as the compound of the present invention represented by Formula (2-4).

(2-4-1)
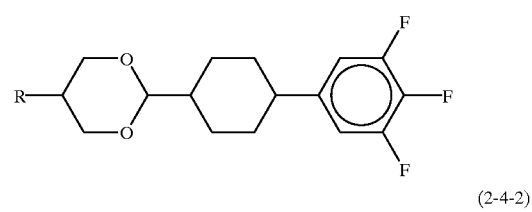

(2-4-2)
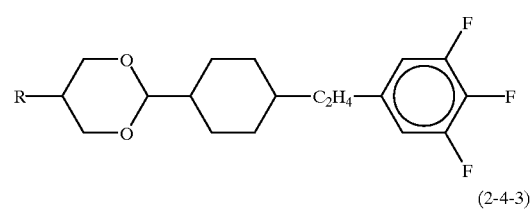

(2-4-3)
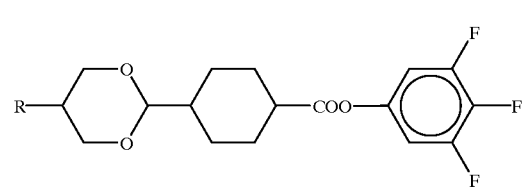

In these formulas, R's each represent independently an alkyl group or alkoxy group having 1 to 10 carbon atoms, or an alkoxymethyl group or alkenyl group having 2 to 10 carbon atoms.

A compound represented by the following Formula (2-5-1) or (2-5-2) is preferably used as the compound of the present invention represented by Formula (2-5).

(2-5-1)
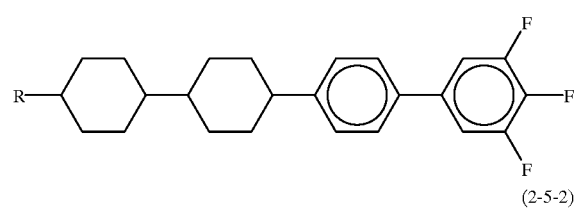

(2-5-2)
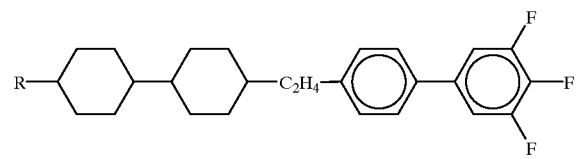

In these formulas, R's each represent independently an alkyl group or alkoxy group having 1 to 10 carbon atoms, or an alkoxymethyl group or alkenyl group having 2 to 10 carbon atoms.

The functions and roles of the compounds constituting the liquid crystal composition of the present invention shall be explained.

The component A in the liquid crystal composition of the present invention has the effects to maintain the viscosity relatively small, increase the optical anisotropy and significantly lower the threshold voltage while maintaining high the voltage-holding ratio of the liquid crystal composition in a high temperature area. Almost all tetracyclic compounds in the component A have a very high $T_{NI}$ (upper limit temperature of liquid crystal) of 80 to 180° C., and therefore the liquid crystal composition having a high $T_{NI}$ can be prepared by using this tetracyclic compound.

Such effects are considered attributable to that the compound represented by Formula (1-1) or (1-2) which is the component A is substituted with fluorine atoms in the 3-position and 5-position of a phenyl ring which is bonded to a carbon atom of a —$CF_2O$— bonding group, so that it has as very large dielectric constant anisotropy as about 20 or more and that it has a relatively small viscosity, a large optical anisotropy and a high resistivity value.

The compound represented by Formula (2-1) in the component B in the liquid crystal composition of the present invention has the effects to reduce the viscosity particularly at a low temperature and control $T_{NI}$, the threshold voltage and the optical anisotropy while maintaining high the voltage-holding ratio of the liquid crystal composition in a high temperature area. This compound represented by Formula (2-1) is a dicyclic compound, and the dielectric constant anisotropic value is not so large as that of the compound of the component A described above but shows a positive value of about 6 to about 8. Further, it has the characteristics that it has a smaller viscosity than that of the compound of the component A described above, a very low $T_{NI}$ (the upper limit temperature of liquid crystal) of 0° C. or lower and a small optical anisotropy.

The compound of the present invention represented by Formula (2-2) has the effects to elevate the upper limit temperature of the liquid crystal composition, reduce the viscosity and control the threshold voltage and the optical anisotropy while maintaining high the voltage-holding ratio of the liquid crystal composition in a high temperature area. The compound of the present invention represented by Formula (2-2) is a tricyclic compound and does not show such level of a dielectric constant anisotropy as that of the compound of the component A but shows a positive value of about 9 to about 13. It has the characteristics that it has a relatively high $T_{NI}$ of 50 to 120° C., a smaller viscosity than that of the compound of the component A and a high resistivity value. Further, it shows a relatively smaller optical anisotropy than that of the compound of the component A.

The compound of the present invention represented by Formula (2-3) or (2-4) has the effects to elevate the dielectric constant anisotropy, reduce the threshold voltage and control the optical anisotropy.

The compound of the present invention represented by Formula (2-3) or (2-4) is a tricyclic compound and does not show such level of a dielectric constant anisotropy as that of the compound of the component A but shows a larger value than that of the compound represented by Formula (2-1) or (2-2). Further, it shows a very smaller optical anisotropy of about 0.04 to about 0.07 than that of the component A.

The compound of the present invention represented by Formula (2-5) has the effects to elevate the upper limit temperature and control the threshold voltage while maintaining high the voltage-holding ratio of the liquid crystal composition in a high temperature area. The compound of the present invention represented by Formula (2-5) is a tetracyclic compound and does not show such level of a dielectric constant anisotropy as that of the compound of the component A but shows a positive value. It has a very high $T_{NI}$ point of 180° C. or higher and a high resistivity value.

The preferred contents of the components constituting the liquid crystal composition of the present invention shall be explained.

The component A in the liquid crystal composition of the present invention has preferably a content of 5 to 95% by weight based on the whole weight of the liquid crystal composition, and the component B has preferably a content of 5 to 95% by weight based on the whole weight of the liquid crystal composition. The threshold voltage is reduced very much by the component A, and the nematic phase range, the optical anisotropy and the threshold voltage are further controlled by the component B. To explain in further details, the threshold voltage can be reduced by blending the compound represented by Formula (1-1) or (1-2) which is the component A in as large amount as possible with the composition, but if a large amount thereof is added, the nematic phase lower limit temperature of the liquid crystal composition is elevated in a certain case. Accordingly, the preferred content of the component A is 95% by weight or less based on the whole weight of the liquid crystal composition. Further, in order to pretty reduce the threshold voltage while maintaining high the voltage-holding ratio of the liquid crystal composition in a high temperature area, the content of the component A is 5% by weight or more, preferably 15% by weight or more based on the whole weight of the liquid crystal composition.

Further, when the tricyclic compound as the component A has a large content, the tricyclic compound has a relatively low $T_{NI}$ of 50° C. or lower in many cases, and therefore the content is more preferably 70% by weight or less based on the whole weight of the composition in order to turn the $T_{NI}$ of the composition to a practical temperature.

The component B in the liquid crystal composition of the present invention has preferably a content of 5 to 95% by weight, more preferably 30 to 95% by weight based on the whole weight of the liquid crystal composition. If the content is less than 5% by weight, troubles are brought about in controlling particularly the nematic phase range and the optical anisotropy, and the content exceeding 95% by weight reduces the effect of the present invention that the threshold voltage is low.

The compounds of Formulas (2-1) to (2-5) have more preferred contents falling in the following ranges respectively.

The compound of the present invention represented by Formula (2-1) has preferably a content of 30% by weight or less, more preferably 25% by weight or less based on the whole weight of the liquid crystal composition. This compound of Formula (2-1) has a very low $T_{NI}$, and therefore if a large amount thereof is added to the composition, the nematic phase lower limit temperature of the liquid crystal composition is lowered.

The compound represented by Formula (2-2) in the liquid crystal composition of the present invention has preferably a content of 95% by weight or less, more preferably 85 to 5% by weight based on the whole weight of the composition. This compound represented by Formula (2-2) has a relatively high $T_{NI}$, and therefore if a large amount thereof is added to the composition, the nematic phase lower limit temperature of the liquid crystal composition is elevated. On the other hand, if the content is very small, reduced are the effects of reducing the viscosity while maintaining the voltage-holding ratio of the liquid crystal composition in a high temperature area and the low threshold voltage, and the effect of elevating the upper limit temperature of the nematic phase is lowered as well.

The compound represented by Formula (2-3) or (2-4) in the liquid crystal composition of the present invention has preferably a content of 50% by weight or less. If this compound is added in a large amount, the nematic phase lower limit temperature of the liquid crystal composition is elevated, and the resistivity value is lowered.

The compound represented by Formula (2-5) in the liquid crystal composition of the present invention has preferably a content of 20% by weight or less based on the whole weight of the composition. If this compound has a large content, the nematic phase lower limit temperature of the liquid crystal composition is elevated.

The synthetic processes of the compounds represented by Formula (1-1) or (1-2) in the present invention, for example, the compounds represented by Formulas (1-1-1), (1-1-16) and (1-2-12) are described in Japanese Patent Application Laid-Open No. 251186/1998. The synthetic processes of the compounds represented by Formulas (2-1-3), (2-2-1) or (2-2-4) are described in Japanese Patent Application Laid-Open No. 233626/1990. The synthetic processes of the compounds represented by Formula (2-4-1) are described in Japanese Patent Application Laid-Open No. 141206/1997. As described above, the compounds in the respective components constituting the composition of the present invention can be synthesized according to prior arts.

Liquid crystal compounds other than the preceding compounds in the component A and the component B can be used for the liquid crystal composition of the present invention in a mixture as long as the object of the present invention is not damaged.

The liquid crystal composition according to the present invention is prepared by conventional processes. In general, employed is a process in which various compounds are mixed and dissolved each other at a high temperature. In order to induce a helical structure of the liquid crystal molecules to control the required twist angle, cholesteryl nonanoate (CN) and a chiral dopant such as CM-43L represented by the following formula may be added:

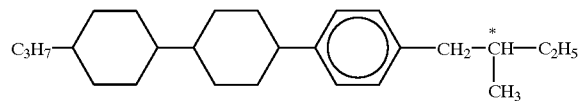

CM-43L

The liquid crystal composition of the present invention can be used as a liquid crystal composition of a guest-host mode by adding dichronic dyes of a merocyanine base, a styryl base, an azo base, an azomethine base, an azoxy base, a quinophthalone base, an anthraquinone base and a tetrazine base. Further, it can be used as a polymer dispersion type liquid crystal display element and liquid crystal compositions of a birefringence-controlling mode and a dynamic scattering mode. It can also be used as a liquid crystal composition of an in.plane.swtching mode.

The present invention can provide a liquid crystal composition having particularly a high voltage-holding ratio in a high temperature area, a sufficiently low threshold voltage and a large optical anisotropy while satisfying general characteristics required to a liquid crystal display element (AM-LCD) of an active matrix mode.

EXAMPLES

The present invention shall be explained below in detail with reference to examples.

TABLE 1

| 1) Left terminal group R— | Symbol | 2) Bonding group —$Z_1$—, —$Z_n$— | Symbol |
|---|---|---|---|
| $C_nH_{2n+1}$— | n- | —$C_2H_4$— | 2 |
| $C_nH_{2n+1}O$— | nO- | —$C_4H_8$— | 4 |
| $C_nH_{2n+1}OC_mH_{2m}$— | nOm- | —COO— | E |
| $CH_2$=CH— | V- | —C≡C— | T |
| $CH_2$=$CHC_nH_{2n}$— | Vn- | —CH=CH— | V |
| $C_nH_{2n+1}CH$=$CHC_mH_{2m}$— | nVm- | —$CF_2O$— | CF2O |
| $C_nH_{2n+1}CH$=$CHC_mH_{2m}CH$=$CHC_kH_{2k}$— | nVmVk- | —$OCF_2$— | OCF2 |

| 3) Ring structure —(Al)—, —(An)— | Symbol | 4) Right terminal group —X | Symbol |
|---|---|---|---|
| ⬡ | B | —F<br>—Cl | —F<br>—CL |
| ⬡(F) | B(F) | —CN<br>—$CF_3$ | —C<br>CF3 |
| ⬡(F,F) | B(2F, 3F) | —$OCF_3$<br>—$OCF_2H$ | —OCF3<br>—OCF2H |

TABLE 1-continued

| Structure | Symbol | Substituent | Code |
|---|---|---|---|
| (difluorobenzene) | B(F, F) | —$C_nH_{2n+1}$<br>—$OC_nH_{2n+1}$ | —n<br>—On |
| (cyclohexane) | H | —$COOCH_3$ | —EMe |
| (pyrimidine) | Py | —$C_nH_{2n}CH{=}CH_2$<br>—$C_mH_{2m}CH{=}CHC_nH_{2n+1}$ | —nV<br>—mVn |
| (dioxane) | D | —$C_mH_{2m}CH{=}CHC_nH_{2n}F$<br>—$CH{=}CF_2$ | —mVnF<br>—VFF |
| (cyclohexene) | Ch | —$C_nH_{2n}CH{=}CF_2$<br>—$C{\equiv}C{-}CN$ | —nVFF<br>—TC |

5) Notation example

Example 1  3-H2B(F, F)B(F)—F

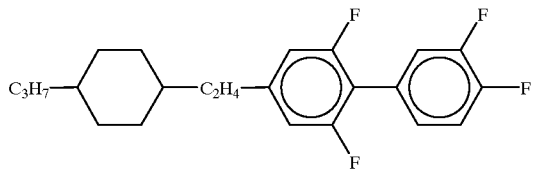

Example 2  3-HB(F)TB-2

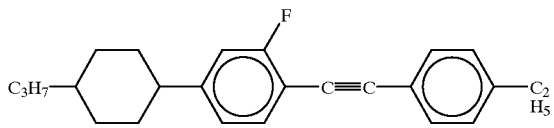

Example 3  1V2-BEB(F, F)—C

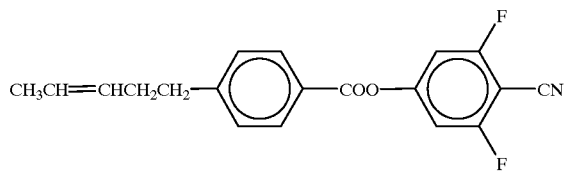

The present invention shall not be restricted to the examples shown below. All composition ratios shown in the examples and the comparative examples were represented by weight %. Compounds used in the examples and the comparative examples were represented by codes based on definitions shown in Table 1.

In the characteristics of the liquid crystal composition, represented were the upper limit temperature of nematic liquid crystal phase by $T_{NI}$, the lower limit temperature of the nematic liquid crystal phase bt TC, the viscosity by η, the optical anistrophy by Δn, the threshold voltage by Vth, the voltage-holding ratio at 25° C. by VHR (25° C.), the voltage-holding ratio at 100° C. by VHR (100° C.) and the response speed by τ.

$T_{NI}$ was determined by measuring the temperature observed when the composition was changed from a nematic phase to an isotropic phase liquid in a step of elevating the temperature by means of a polarizing microscope.

TC was judged by the liquid crystal phases after the liquid crystal compositions were left standing for 30 days in the respective freezers of 10° C., 0° C., −10° C., −20° C., −30° C. and −40° C. (for example, when one liquid crystal composition took a nematic phase state at −20° C. and was crystallized or turned into smectic phase state at −30° C., TC of the liquid crystal composition was expressed by <−20° C.).

η was measured at 20° C.

Δn was measured at 25° C. using a light source lamp having a wavelength at 589 nm.

Vth was measured at 25° C. Vth was represented by a value of voltage applied when the transmission factor of light passing through the cell became 90%, wherein the cell having a cell gap of (0.5/Δn) μm and a twist angle of 80° was used, and a square wave having a frequency of 32 Hz was applied in a normally white mode. The voltage-holding ratio was determined by an area method.

τ was defined by a value of the sum of τ on and τ off, wherein the liquid crystal composition to which cholesteric nonanoate was added so that the pitch of twist was controlled to 80 μm was put in a sell having a cell gap of (0.5/Δn) μm and a twist angle of 80°; a 5 V square wave having a frequency of 1 kHz was applied thereto to determine the response speed (τ on) when the liquid crystal rose up and the response speed (τ off) when the liquid crystal fell down. In this case, the measuring temperature was 25° C.

Compounds used for the compositions shown in the examples (32 to 42, 44 and 45) of Japanese Patent Application Laid-Open No. 251186/1998 are analogous to those of Formula (1-1) in the present invention but are not the same compounds.

A difference between the compounds of the present invention represented by Formula (1-1) and the compounds of Japanese Patent Application Laid-Open No. 251186/1998 shall be shown below.

A mother liquid crystal having the following composition was prepared:

| 3-HB—C | 24% | $T_{NI}$ = 71.7° C. |
| 5-HB—C | 36% | Δε = 11.0 |
| 7-HB—C | 25% | Δn = 0.137 |
| 3-HBB—C | 15% | η = 27.0 mPa · s | and the following compounds a, b and c were added to this mother liquid crystal each in 15%:

a: 3-BB (F, F) CF2OB (F, F) -F
  <R in Formula (1-1-3) of the present invention: $C_3H_7$>
b: 3-B (F, F) CF2OBB (F, F) -F
  <R in Formula (1-2-4) of the present invention: $C_3H_7$>
c: 3-B (F) CF2OBB (F, F) -F
  <Japanese Patent Application Laid-Open No. 251186/1998 (compound described in Example 34)>

The physical properties thereof were measured, and the physical properties of the compounds a, b and c obtained from the measured values thereof and the physical properties of the mother liquid crystal by extrapolation shall be shown in the following Table 2.

TABLE 2

| | Extrapolated physical property value | | | |
|---|---|---|---|---|
| Compound | $T_{NI}$(° C.) | Δε | Δn | η (mPa · s) |
| a | −5.0 | 29.7 | 0.110 | 40.2 |
| b | −9.8 | 27.6 | 0.104 | 46.6 |
| c | −6.3 | 21.1 | 0.104 | 53.1 |

It is apparent from this Table 2 that the compound a or b of the present invention represented by Formula (1-1) has larger Δn and Δε and lower η than those of the compound c described in Example 34 of Japanese Patent Application Laid-Open No. 251186/1998. Further, the tetracyclic compounds had the same tendency.

Further, detailed explanations shall be given with reference to the following examples and comparative examples.

Example A

A composition comprising as the component A:

| 2-BB (F, F) CF2OB (F, F)—F | 14% |
| 3-BB (F, F) CF2OB (F, F)—F | 14% | as the component B:

| 3-H2HB (F, F)—F | 12% |
| 4-H2HB (F, F)—F | 10% |
| 5-H2HB (F, F)—F | 10% |
| 3-HHB (F, F)—F | 10% |
| 4-HHB (F, F)—F | 5% |
| 3-HH2B (F, F)—F | 10% |
| 3-HBB (F, F)—F | 3% |
| 2-HHBB (F, F)—F | 4% |
| 3-HHBB (F, F)—F | 4% |
| 4-HHBB (F, F)—F | 4% | was prepared. The characteristics of the composition are shown in Table 3.

Comparative Example A

The same procedure as in Example A was repeated to prepare a liquid crystal composition, except that the following component D (a compound of Formula (1) described in Japanese Patent Application No. 251186/1998) was substituted for the component A. The characteristics of the composition are shown in Table 3.

Component D

| 2-HB (F, F) CF2OB (F, F)—F | 14% |
| 3-HB (F, F) CF2OB (F, F)—F | 14% |

TABLE 3

| Composition Characteristics | | Example A | Comparative Example A |
|---|---|---|---|
| $T_{NI}$ | ° C. | 71.4 | 71.8 |
| θ | mPa · s | 31.6 | 30.8 |
| Δn | | 0.096 | 0.083 |
| Vth | V | 1.05 | 1.14 |
| Δε | | 11.8 | 10.0 |
| VHR (25° C.) | % | 98.5 | 98.5 |
| VHR (100° C.) | % | 95.3 | 95.4 |
| τ | mS | 33 | 40 |

As apparent from Table 3, the composition of Example A has a larger optical anisotropy, a larger Δε, a lower threshold voltage and a faster response speed as compared with those of the composition of Comparative Example A. This is considered attributable to that the compound in the component A of Example A has more phenylene rings as compared with that of the compound in the component D of Comparative Example A.

Example 1

A composition comprising
as the component A:

| | |
|---|---|
| 2-BB (F, F) CF2OB (F, F)—F | 9% |
| 3-BB (F, F) CF2OB (F, F)—F | 9% | as the component B:

| | |
|---|---|
| 7-HB (F, F)—F | 6% |
| 3-H2HB (F, F)—F | 9% |
| 4-H2HB (F, F)—F | 9% |
| 5-H2HB (F, F)—F | 9% |
| 3-HHB (F, F)—F | 7% |
| 4-HHB (F, F)—F | 5% |
| 3-HH2B (F, F)—F | 13% |
| 4-HH2B (F, F)—F | 5% |
| 5-HH2B (F, F)—F | 10% |
| 2-HHBB (F, F)—F | 3% |
| 3-HHBB (F, F)—F | 3% |
| 3-HH2BB (F, F)—F | 3% | was prepared. The composition described above had characteristics shown below:

| | |
|---|---|
| $T_{NI}$ | =74.5° C. |
| TC | <−20° C. |
| θ | =27.8 mPa·s |
| Δn | =0.086 |
| Vth | =1.21 V |
| Δε | =10.7 |
| VHR (25° C.) | =98.7% |
| VHR (100° C.) | =95.1% |

This composition has a high VHR at a high temperature, a very small Vth and a small viscosity as compared with those of the compositions of the comparative examples described later. It has a high $T_{NI}$ a high holding rate and a low viscosity as compared with those of the composition of Comparative Example 2.

Example 2

A composition comprising
as the component A:

| | |
|---|---|
| 2-BB (F, F) CF2OB (F, F)—F | 10% |
| 3-BB (F, F) CF2OB (F, F)—F | 10% |
| 2-HBB (F, F) CF2OB (F, F)—F | 11% |
| 3-HBB (F, F) CF2OB (F, F)—F | 12% | as the component B:

| | |
|---|---|
| 3-H2HB (F, F)—F | 12% |
| 4-H2HB (F, F)—F | 10% |
| 5-H2HB (F, F)—F | 10% |
| 3-HHB (F, F)—F | 8% |
| 4-HHB (F, F)—F | 5% |
| 3-HH2B (F, F)—F | 6% |
| 3-HBB (F, F)—F | 6% | was prepared. This composition had characteristics shown below:

| | |
|---|---|
| $T_{NI}$ | =73.5° C. |
| TC | <−30° C. |
| η | =34.0 mPa·s |
| Δn | =0.105 |
| Vth | =1.01 V |
| Δε | =13.6 |
| VHR (25° C.) | =98.7% |
| VHR (100° C.) | =95.3% |

This composition has a high VHR at a high temperature and a very small Vth as compared with those of the compositions of the comparative examples described later.

Example 3

A composition comprising
as the component A:

| | |
|---|---|
| 2-BB (F, F) CF2OB (F, F)—F | 12% |
| 3-BB (F, F) CF2OB (F, F)—F | 13% |
| 3-HBB (F, F) CF2OB (F)—F | 5% |
| 2-HBB (F, F) CF2OB (F, F)—F | 10% |
| 3-HBB (F, F) CF2OB (F, F)—F | 10% |
| 2-BB (F, F) CF2OBB (F)—F | 5% |
| 3-BB (F, F) CF2OBB (F)—F | 5% |
| 3-BB (F, F) CF2OB (F, F) B (F)—F | 3% |
| 2-BBB (F, F) CF2OB (F, F)—F | 3% |
| 3-BBB (F, F) CF2OB (F, F)—F | 4% | as the component B:

| | |
|---|---|
| 3-HHB (F, F)—F | 8% |
| 4-HHB (F, F)—F | 5% |
| 3-H2HB (F, F)—F | 10% |
| 3-H2BB (F, F)—F | 7% | was prepared. This composition had characteristics shown below:

| | |
|---|---|
| $T_{NI}$ | =78.7° C. |
| TC | <−20° C. |
| Δn | =0.139 |
| Vth | =1.00 V |
| Δε | =16.4 |
| VHR (25° C.) | =98.7% |
| VHR (100° C.) | =95.2% |

This composition has a high VHR at a high temperature and a very small Vth as compared with those of the compositions of the comparative examples described later.

Example 4

A composition comprising
as the component A:

| | |
|---|---|
| 2-BB (F, F) CF2OB (F, F)—F | 10% |
| 3-BB (F, F) CF2OB (F, F)—F | 15% |
| 2-HBB (F, F) CF2OB (F, F)—F | 10% |
| 3-HBB (F, F) CF2OB (F, F)—F | 10% |

-continued

| | |
|---|---|
| 2-BB (F, F) CF2OBB (F)—F | 9% |
| 3-BB (F, F) CF2OBB (F)—F | 9% |
| 3-BB (F, F) CF2OBB (F)—OCF3 | 7% | as the component B:

| | |
|---|---|
| 3-HHB (F, F)—F | 7% |
| 4-HHB (F, F)—F | 4% |
| 3-H2HB (F, F)—F | 7% |
| 3-HDB (F, F)—F | 6% |
| 3-DHB (F, F)—F | 6%. | was prepared. This composition had characteristics shown below:

| | |
|---|---|
| $T_{NI}$ | =76.1° C. |
| TC | <−20° C. |
| $\Delta n$ | =0.132 |
| Vth | =0.96 V |
| $\Delta\epsilon$ | =17.7 |
| VHR (25° C.) | =98.7% |
| VHR (100° C.) | =95.0% |

This composition has a high VHR at a high temperature and a very small Vth as compared with those of the compositions of the comparative examples described later.

Example 5

A composition comprising
as the component A:

| | |
|---|---|
| 3-BB (F, F) CF2OB (F, F)—F | 9% |
| 3-BB (F, F) CF2OB (F)—F | 5% |
| 3-BB (F, F) CF2OB (F)—OCF3 | 5% |
| 3-BB (F, F) CF2OB (F)—OCF2H | 5% | as the component B:

| | |
|---|---|
| 3-H2HB (F, F)—F | 9% |
| 4-H2HB (F, F)—F | 9% |
| 5-H2HB (F, F)—F | 9% |
| 3-HHB (F, F)—F | 7% |
| 4-HHB (F, F)—F | 5% |
| 3-HH2B (F, F)—F | 10% |
| 5-HH2B (F, F)—F | 10% |
| 3-HHEB (F, F)—F | 8% |
| 2-HHBB (F, F)—F | 3% |
| 3-HHBB (F, F)—F | 3% |
| 3-HH2BB (F, F)—F | 3% | was prepared. This composition had characteristics shown below:

| | |
|---|---|
| $T_{NI}$ | =80.0° C. |
| TC | <−20° C. |
| $\eta$ | =28.8 mPa · s |
| $\Delta n$ | =0.091 |
| Vth | =1.23 V |
| $\Delta\epsilon$ | =10.7 |
| VHR (25° C.) | =98.7% |
| VHR (100° C.) | =95.3% |

Example 6

A composition comprising
as the component A:

| | |
|---|---|
| 2-BB (F, F) CF2OB (F, F)—F | 9% |
| 3-BB (F, F) CF2OB (F, F)—F | 9% | as the component B:

| | |
|---|---|
| 7-HB (F, F)—F | 6% |
| 3-H2HB (F, F)—F | 9% |
| 4-H2HB (F, F)—F | 9% |
| 5-H2HB (F, F)—F | 9% |
| 3-HHB (F, F)—F | 7% |
| 4-HHB (F, F)—F | 5% |
| 3-HH2B (F, F)—F | 4% |
| 3-HHBB (F, F)—F | 3% | as other components:

| | |
|---|---|
| 3-HB-O2 | 3% |
| 3-HH-4 | 10% |
| 3-HH-5 | 5% |
| 3-HHB-1 | 2% |
| 4-HHB-CL | 4% |
| 2-HHHB (F, F)—F | 2% |
| 3-HHHB (F, F)—F | 2% |
| 4-HHBB (F, F)—F | 2% | was prepared. This composition had characteristics shown below:

| | |
|---|---|
| $T_{NI}$ | =72.9° C. |
| TC | <−20° C. |
| $\eta$ | =20.8 mPa · s |
| $\Delta n$ | =0.082 |
| Vth | =1.23 V |
| $\Delta\epsilon$ | =8.0 |
| VHR (25° C.) | =98.7% |
| VHR (100° C.) | =95.3% |

Example 7

A composition comprising
as the component A:

| | |
|---|---|
| 3-BB (F, F) CF2OB (F, F)—F | 6% |
| 2-HBB (F, F) CF2OB (F, F)—F | 9% |
| 3-HBB (F, F) CF2OB (F, F)—F | 9% | as the component B:

| | |
|---|---|
| 3-H2HB (F, F)—F | 12% |
| 4-H2HB (F, F)—F | 9% |
| 5-H2HB (F, F)—F | 9% |
| 3-HHB (F, F)—F | 7% |
| 4-HHB (F, F)—F | 5% |
| 3-HH2B (F, F)—F | 15% |
| 3-HBB (F, F)—F | 6% |
| 5-HBB (F, F)—F | 4% |
| 3-HB (F) B (F, F)—F | 4% |
| 2-HHHB (F, F)—F | 2% |
| 3-HHHB (F, F)—F | 3% | was prepared. This composition had characteristics shown below:

| | |
|---|---|
| $T_{NI}$ | =90.2° C. |
| TC | <−20° C. |
| η | =32.8 mPa · s |
| Δn | =0.103 |
| Vth | =1.26 V |
| Δε | =10.2 |
| VHR (25° C.) | =98.7% |
| VHR (100° C.) | =95.2% |

Example 8

A composition comprising as the component A:

| | |
|---|---|
| 3-B (F) B (F, F) CF2OB (F, F)—F | 4% |
| 3-BB (F, F) CF2OB (F, F)—F | 10% |
| 3-BB (F, F) CF2OB (F)—F | 4% |
| 3-DBB (F, F) CF2OB (F, F)—F | 10% |
| 3-B (F) BB (F, F) CF2OB (F)—F | 5% |
| 3-BB (F) B (F, F) CF2OB (F)—CL | 5% |
| 3-BB (F) B (F, F) CF2OB (F, F)—F | 5% | as the component B:

| | |
|---|---|
| 3-H2HB (F, F)—F | 12% |
| 5-H2HB (F, F)—F | 10% |
| 3-HHB (F, F)—F | 8% |
| 4-HHB (F, F)—F | 5% |
| 3-HH2B (F, F)—F | 7% | as other components:

| | |
|---|---|
| 3-HHB (F)—F | 5% |
| 4-HHB (F)—F | 5% |
| 3-HHB (F, F) CF2OB (F, F)—F | 5% |
| CM-43L | 0.23% |

Example 9

A composition comprising
as the component A:

| | |
|---|---|
| 2-BB (F, F) CF2OB (F, F)—F | 12% |
| 3-BB (F, F) CF2OB (F, F)—F | 12% |
| 3-HBB (F, F) CF2OB (F)—F | 5% |
| 2-HBB (F, F) CF2OB (F, F)—F | 10% |
| 3-HBB (F, F) CF2OB (F, F)—F | 10% |
| 3-HBB (F, F) CF2OB (F)—OCF3 | 9% |
| 3-HBB (F, F) CF2OB (F, F)—OCF3 | 7% |
| 3-HB (F, F) CF2OBB (F)—F | 5% |
| 3-B (F) BB (F, F) CF2OB (F, F)—F | 8% |
| 3-BB (F) B (F, F) CF2OB (F, F)—F | 8% |
| 3-BB (F, F) CF2OB (F, F) B (F)—F | 5% | as the component B:

| | |
|---|---|
| 3-HHB (F, F)—F | 9% | as other components:

| | |
|---|---|
| CM-43L | 0.21% |

Comparative Example 1

Prepared was the following composition described in Example 7 having the largest Δn among those of the compositions described in Japanese Patent Application Laid-Open No. 73857/1996:

| | |
|---|---|
| 2-HBEB (F, F)—F | 5% |
| 5-HHEB (F, F)—F | 5% |
| 3-BBEB (F, F)—F | 5% |
| 4-HHB—CL | 10% |
| 3-HBB (F, F)—F | 10% |
| 5-HBB (F, F)—F | 10% |
| 3-H2BB (F, F)—F | 10% |
| 4-H2BB (F, F)—F | 10% |
| 5-H2BB (F, F)—F | 10% |
| 3-HVHB (F)—F | 5% |
| 4-HVHB (F, F)—F | 7% |
| 3-H2BVB-2 | 3% |
| 3-HB (F) VB-4 | 10% |

The composition described above had characteristics shown below:

| | |
|---|---|
| $T_{NI}$ | =101.5° C. |
| η | =36.9 mPa · s |
| Δn | =0.138 |
| Vth | =1.73 V |
| VHR (25° C.) | =98.5% |
| VHR (100° C.) | =91.0% |
| τ | =37 ms |

This composition has a high $T_{NI}$ and a relatively quick response speed but has a high Vth. A compound having an ester group is used for this composition, and therefore it has the defect that the VHR at a high temperature is low.

Comparative Example 2

Prepared was the following composition described in Example 2 having the lowest Vth among those of the compositions described in Japanese Patent Application Laid-Open No. 73857/1996:

| | |
|---|---|
| 5-HHEB (F, F)—F | 5% |
| 2-HBEB (F, F)—F | 5% |

-continued

| | |
|---|---|
| 3-HBEB (F, F)—F | 5% |
| 5-HBEB (F, F)—F | 5% |
| 3-BBEB (F, F)—F | 5% |
| 4-BBEB (F, F)—F | 5% |
| 5-BBEB (F, F)—F | 5% |
| 4-HEB (F, F)—F | 10% |
| 4-HB—CL | 10% |
| 7-HB (F)—F | 3% |
| 7-HB (F, F)—F | 9% |
| 3-HBB (F, F)—F | 10% |
| 5-HHB (F, F)—F | 10% |
| 3-H2BB (F, F)—F | 13% |

The composition described above had characteristics shown below:

| | |
|---|---|
| $T_{NI}$ | =46.1° C. |
| TC | <−10° C. |
| η | =36.3 mPa·s |
| Δn | =0.096 |
| Vth | =0.91 V |
| VHR (25° C.) | =98.3% |
| VHR (100° C.) | =92.3% |

This composition has a low Vth but has a low $T_{NI}$. A compound having an ester group is used as is the case with Comparative Example 1, and therefore this composition has the defect that the VHR at a high temperature is low.

Comparative Example 3

Prepared was the following composition described in Example 7 having the lowest Vth among those of the compositions described in Japanese Patent Application Laid-Open No. 31460/1997:

| | |
|---|---|
| 7-HB (F, F)—F | 7% |
| 3HHB (F, F)—F | 7% |
| 3H2HB (F, F)—F | 3% |
| 3-HH2B (F, F)—F | 7% |
| 5-HH2B (F, F)—F | 5% |
| 3-HBB (F, F)—F | 21% |
| 5-HBB (F, F)—F | 21% |
| 2-HBEB (F, F)—F | 3% |
| 3-HBEB (F, F)—F | 5% |
| 5-HBEB (F, F)—F | 3% |
| 3-HHEB (F, F)—F | 10% |
| 4-HHEB (F, F)—F | 3% |
| 5-HHEB (F, F)—F | 5% |

The composition described above had characteristics shown below:

| | |
|---|---|
| $T_{NI}$ | =61.4° C. |
| TC | <−30° C. |
| η | =30.7 mPa·s |
| Δn | =0.094 |
| Vth | =1.05 V |
| VHR (25° C.) | =98.3% |
| VHR (100° C.) | =92.5% |

This composition has a low Vth but has the defects that the $T_{NI}$ and the VHR at a high temperature are low.

Comparative Example 4

Prepared was the following composition described in Example 12 having the largest Δn among those of the compositions described in Japanese Patent Application Laid-Open No. 31460/1997:

| | |
|---|---|
| 7-HB (F, F)—F | 9% |
| 3-HHB (F, F)—F | 10% |
| 3-HH2B (F, F)—F | 7% |
| 5-HH2B (F, F)—F | 5% |
| 3-HBB (F, F)—F | 18% |
| 5-HBB (F, F)—F | 18% |
| 3-HBEB (F, F)—F | 5% |
| 5-HBEB (F, F)—F | 3% |
| 3-HHEB (F, F)—F | 8% |
| 5-HHEB (F, F)—F | 5% |
| 2-HHBB (F, F)—F | 4% |
| 3-HHBB (F, F)—F | 4% |
| 5-HH2BB (F, F)—F | 4% |

The composition described above had characteristics shown below:

| | |
|---|---|
| $T_{NI}$ | =78.3° C. |
| TC | <−30° C. |
| η | =30.2 mPa·s |
| Δn | =0.103 |
| Vth | =1.21 V |
| VHR (25° C.) | =98.4% |
| VHR (100° C.) | =91.5% |

This composition has the defects that the Vth is high and the VHR at a high temperature is low.

Comparative Example 5

Prepared was the following composition described in Example 36 having the lowest Vth among those of the compositions described in WO96/11897:

| | |
|---|---|
| 3-HBCF2OB (F, F)—F | 5% |
| 5-HBCF2OB (F, F)—F | 10% |
| 5-HBCF2OB—CF3 | 5% |
| 5-HBCF2OB (F)—F | 5% |
| 3-HBCF2OB—OCF3 | 5% |
| 7-HB (F, F)—F | 8% |
| 3-HHB (F, F)—F | 6% |
| 4-HHB (F, F)—F | 3% |
| 3-H2HB (F, F)—F | 10% |
| 4-H2HB (F, F)—F | 6% |
| 5-H2HB (F, F)—F | 6% |
| 3-HH2B (F, F)—F | 10% |
| 5-HH2B (F, F)—F | 5% |
| 3-HBB (F, F)—F | 5% |
| 5-HBB (F, F)—F | 5% |
| 3-HHBB (F, F)—F | 3% |
| 3-HH2BB (F, F)—F | 3% |

The composition described above had characteristics shown below:

| | |
|---|---|
| $T_{NI}$ | =61.8° C. |
| TC | <−20° C. |
| η | =23.6 mPa·s |
| Δn | =0.083 |
| Vth | =1.50 V |
| VHR (25° C.) | =98.7% |
| VHR (100° C.) | =95.6% |

This composition has a low viscosity, a low Vth and a high VHR at a high temperature but has the defect that $T_{NI}$ is low

Comparative Example 6

Prepared was the following composition described in Example 37 having the largest Δn among those of the compositions described in WO96/11897:

| | |
|---|---|
| 3-HBCF2OB (F, F)—F | 5% |
| 3-HBCF2OB—OCF3 | 5% |
| 3-HB—CL | 4% |
| 5-HB—CL | 4% |
| 7-HB—CL | 5% |
| 2-HHB—CL | 6% |
| 3-HHB—CL | 7% |
| 5-HHB—CL | 6% |
| 2-HBB (F)—F | 6% |
| 3-HBB (F)—F | 6% |
| 5-HBB (F)—F | 12% |
| 3-HBB (F, F)—F | 13% |
| 5-HBB (F, F)—F | 13% |
| 3-H2HB (F)—CL | 3% |
| 3-HB (F) TB-2 | 3% |
| 3-HB (F) VB-2 | 2% |

The composition described above had characteristics shown below:

| | |
|---|---|
| $T_{NI}$ | =89.3° C. |
| TC | <−20° C. |
| η | =21.9 mPa·s |
| Δn | =0.128 |
| Vth | =2.08 V |
| VHR (25° C.) | =98.4% |
| VHR (100° C.) | =93.5% |

This composition has a low viscosity and a high $T_{NI}$ but has the defects that the Vth is high and the VHR at a high temperature is a little low.

Comparative Example 7

Prepared was the following composition described in Example 41 having the largest Δn among those of the compositions described in Japanese Patent Application Laid-Open No. 251186/1998:

| | |
|---|---|
| 3-HB (F, F) CF2OB (F, F)—F | 5% |
| 5-HBBCF2OB (F, F)—F | 5% |
| 2-HHB (F)—F | 2% |
| 3-HHB (F)—F | 2% |
| 5-HHB (F)—F | 2% |
| 2-HBB (F)—F | 6% |
| 3-HBB (F)—F | 6% |
| 2-H2BB (F)—F | 9% |
| 3-H2BB (F)—F | 9% |
| 3-HBB (F, F)—F | 25% |
| 5-HBB (F, F)—F | 19% |
| 1O1-HBBH-4 | 5% |
| 1O1-HBBH-5 | 5% |

The composition described above had characteristics shown below:

| | |
|---|---|
| $T_{NI}$ | =95.8° C. |
| η | =35.5 mPa·s |
| Δn | =0.132 |
| Vth | =1.72 V |
| VHR (25° C.) | =98.2% |
| VHR (100° C.) | =95.1% |

This composition has a high VHR at a high temperature but has the defect that the Vth is high.

What is claimed is:

1. A liquid crystal composition comprising a component A being at least one compound selected from the group of compounds represented by Formulas (1-1) and (1-2) and a component B being at least one compound selected from the group of compounds represented by Formulas (2-1), (2-2-1), (2-2-2), (2-2-3), (2-2-4), (2-3) and (2-4):

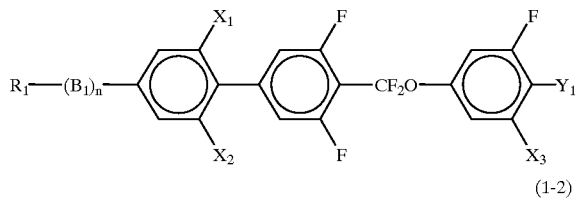

(1-1)

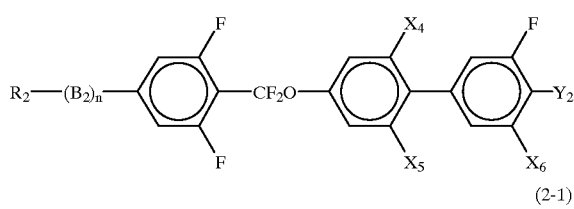

(1-2)

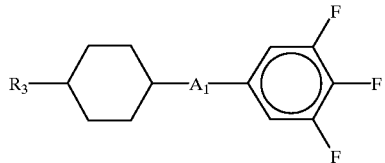

(2-1)

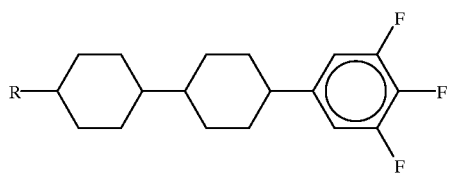

(2-2-1)

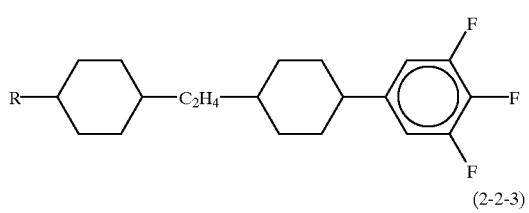

(2-2-2)

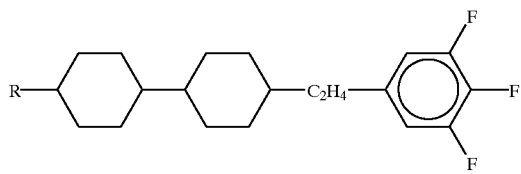

(2-2-3)

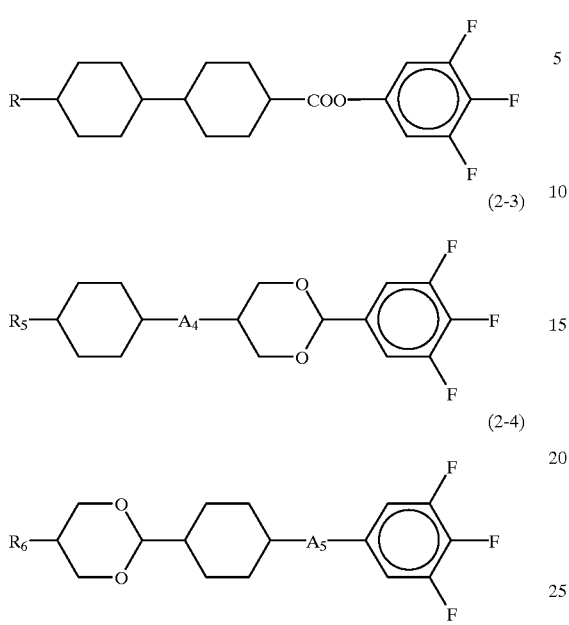

wherein each R independently represents an alkyl group or alkoxy group having 1 to 10 carbon atoms, or an alkoxymethyl group or alkenyl group having 2 to 10 carbon atoms; $R_1$, $R_2$, $R_3$, $R_5$ and $R_6$ each represent independently an alkyl group or alkoxy group having 1 to 10 carbon atoms, or an alkenyl group or alkoxymnethyl group having 2 to 10 carbon atoms; $A_1$, $A_4$ and $A_5$ each represent independently a single bond, —$C_2H_4$— or —COO—; $X_1$, $X_2$, $X_3$, $X_4$, $X_5$ and $X_6$ each represent independently H or F; $B_1$ and $B_2$ each represent independently a single bond, cyclohexylene, trans-1,3-dioxane-2,5-diyl, 1,4-phenylene or 1,4-phenylene substituted by 1 to 4 fluorine atoms; $Y_1$ and $Y_2$ each represent independently F, $OCF_3$, $CF_2H$ or Cl; and n is 0 or 1.

2. A liquid crystal composition according to claim 1, which comprises the component A of 5 to 95% by weight and the component B of 5 to 95% by weight, respectively, based on the total quantity of the liquid crystal composition.

3. A liquid crystal display element containing a liquid crystal composition as set forth in claim 1.

4. A liquid crystal display element containing a liquid crystal composition as set forth in claim 2.

* * * * *